Aug. 16, 1938.  F. D. WENN  2,127,097
SAFETY EMERGENCY BRAKE LEVER
Filed Sept. 16, 1937  2 Sheets-Sheet 1

INVENTOR.
FLOYD D. WENN
BY Louis Illmer
ATTORNEY

Aug. 16, 1938.   F. D. WENN   2,127,097
SAFETY EMERGENCY BRAKE LEVER
Filed Sept. 16, 1937   2 Sheets-Sheet 2

INVENTOR.
FLOYD D. WENN
BY Louis Ullmer
ATTORNEY

Patented Aug. 16, 1938

2,127,097

UNITED STATES PATENT OFFICE 2,127,097

SAFETY EMERGENCY BRAKE LEVER

Floyd D. Wenn, Binghamton, N. Y., assignor to The Brewer-Titchener Corporation, Cortland, N. Y., a corporation of New York Application September 16, 1937, Serial No. 164,111

6 Claims. (Cl. 74—531)

This invention relates to certain novel structural improvements pertaining to a compactly assembled emergency brake lever or similar manipulative control for automotive or other vehicle brakes designed to afford augmented safety against inadvertent release when set, particularly as applied to a positively retained brake lever of the one-way clutch type adapted to frictionally grip a toothless sector bar or the like without slip. In its sectionalized form, such brake lever may comprise a pair of pivotally connected thigh and shank sections arranged to be differently inclined to a limited extent about such knuckle joint. A cooperating trip lever section serves to unrestrainedly actuate said clutch when the thigh and shank sections are brought into a certain inclined relationship.

The free manipulative end of my shank lever section may be shaped into a grippable handle portion while a remote end of the thigh lever section may be mounted to turn about a main fulcrum supported by stationary bracket means provided with a toothless sector rod or equivalent means. Intermediate its ends, said trip lever is preferably but not necessarily mounted upon the knuckle pivot and one trip lever end is operatively connected to shift the clutch into released position against spring tension. The other trip lever end may be extended to terminate in a spring retained thumb piece that is cooperatively carried alongside the handle of the shank lever section.

My trip lever constitutes a lockable remote control for manipulatively releasing a one-way clutch block after the draft rod has been set into braking position. The present lever disclosure is more especially designed for inverted suspension behind an automotive instrument board but it may also be otherwise installed. The depending lever handle is preferably located within easy reach of the driver, said handle then being raised about its main fulcrum to apply the brakes. The assembly may be so mounted that said thumb piece is placed toward the driver and rearwardly of said shank handle so as to function in a convenient and readily understood manner. Such arrangement allows the gripped lever handle to be strenuously drawn rearwardly in the direction of the driver's seat to apply the emergency brake without confusion or causing the associated thumb piece to be inadvertently manipulated by the driver while setting up the wheel brakes.

In order to release a set brake, a definite sequence of events is made inherent in my safety locking devices. The required inter-related movement between my several lever sections is such that a locked clutch block cannot become accidentally disengaged from the sector bar except by a deliberate successive manipulation of certain lever sections in a predetermined order. In the present lever system, its locking devices act automatically and are devoid of any latch bolt or extraneous lock of the conventional key type that needs to be independently manipulated prior to the release of a restrained clutch block.

It is emphasized that when relying upon a frictionally engaged clutch block as a substitute for ratchet teeth, its set grip may under adverse conditions such as severe road jars or the like disturbances, tend to slip and thereby partially loosen a tensioned draft rod. The intent of the present innovation is to fortify and otherwise generally improve such block grip by appropriate detent means. Adequate protection against premature release is particularly important in the case of an automobile or truck when parked on a steep hillside in which children may be carried as front seat passengers. My several lever sections are therefore arranged to afford increased safety against being jarred or casually knocked loose while set because of some unforseen circumstance that may result in accidental clutch release, which occurrence has in some instances led to disastrous consequences.

The instant disclosure represents a continuation of my earlier application, Serial Number 145,209 as filed May 28, 1937.

The object of the present invention is to contrive an easily manipulative brake lever assembly of the indicated character provided with automatic safety locking means that may be compactly incorporated in automotive equipment on a low-cost productive basis.

Reference is had to the accompanying two sheets of drawings which are illustrative of a preferred layout of my brake lever, and in which:

Fig. 1 is an elevational side view of a brake lever assembly equipped with my improved clutch block, while Fig. 2 is an edge view thereof, the clutch block being shown locked in the mid travel position of the lever.

Fig. 3 details in perspective, a side face of such block, while Fig. 4 represents a cross-sectional view along line 4—4 of Fig. 1.

Figure 1:
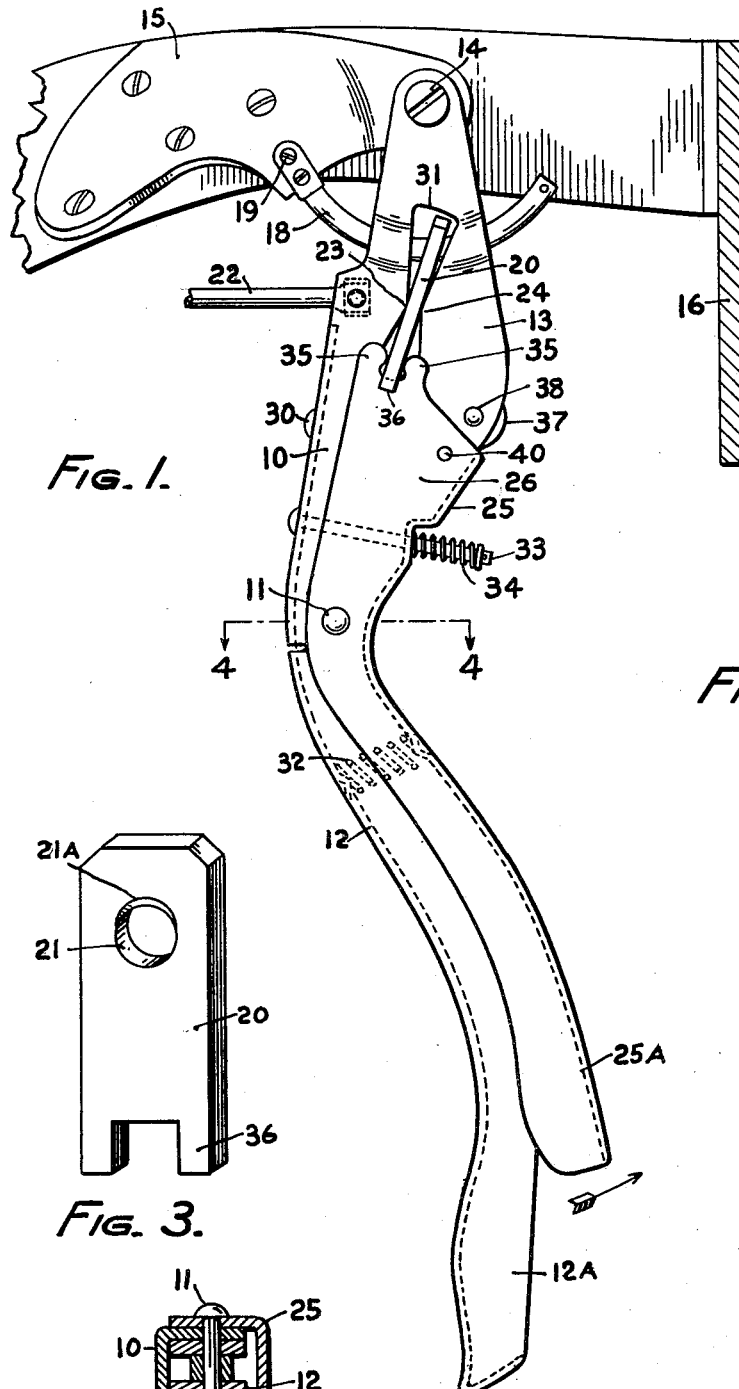
Figure 2:
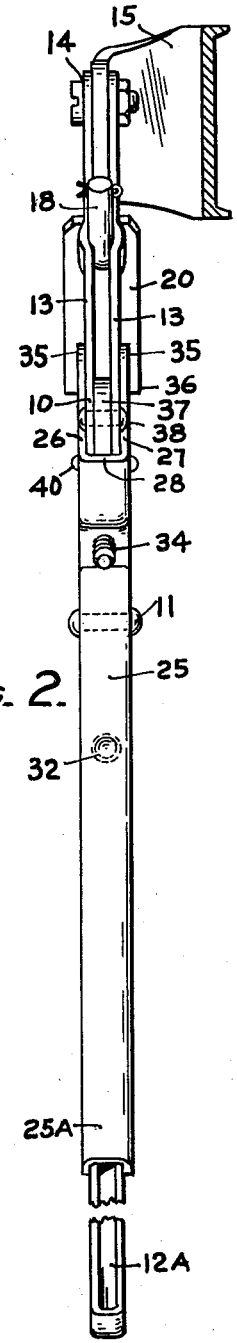

In the disclosed exemplification, my primary brake lever is preferably of the jointed sectionalized type that may comprise a sheet metal thigh section 10 having a channeled cross-sectional profile of which one end region is equipped with a knuckle pivot 11. A similar but reversely nested shank section 12 may intermediate its ends, be mounted on the same pivot and provided with a handle or grip 12A. The opposite end region of said thigh section may be forked as at 13 and mounted to turn on the fulcrum or main pivot 14. Such fulcrum may be upheld by the bracket plate 15 disposed interiorly behind the instrument board 16 of an automobile. Said bracket plate may be attached to some suitable cowl fixture and have an overhanging portion apertured to allow of entering the main pivot 14 therethrough, the thigh forks 13 being preferably arranged to straddle said plate as shown and allow the lever to depend therefrom.

One end of an arcuate rod or the like toothless sector bar 18 of hardened metal may be fixedly bolted at 19 to the bracket plate, the center of curvature of which bar is preferably kept coincident with the axis of the main pivot 14. Each lever fork 13 may be recessed to provide clearance around the interposed sector bar. However, it is not essential to resort to duplicate or balanced forks, since one such may suffice for present purposes. The reciprocative draft rod 22 is preferably attached to the thigh lever section adjacent to the sector bar, thence carried forwardly and downwardly through the vehicle floor in a conventional manner to actuate a brake band (not shown).

Figure 3:
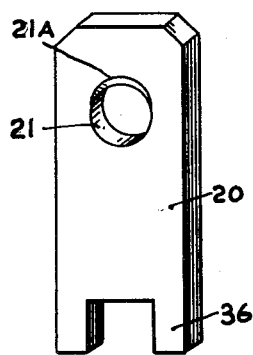

Each fork region of the thigh section may be pierced by registering bipartite slots such as 31 whose respective endless perimeters are here given a double lobe-shaped pattern adapted to receive and to constitute fulcrum means for my floatingly mounted tiltable clutch block 20. A suitable layout for an actuated one-way clutch block is detailed in Fig. 3, and as such may take the form of a hardened elongated metal plate of which one end region has a round or oval aperture 21 whose major diametral size is kept somewhat larger than that of the sector bar mounted therethrough. Said aperture allows the plate faces to rock or tilt laterally within finite limits with respect to the longitudinal axis X—X of the sector bar 18, said clutch block being preferably of a type in which its fulcrum is located between the sector bar and the actuated block end. An edge portion of such aperture may be chamfered as at 22A.

It will be understood that other equivalent styles of clutch blocks may be substituted, the present improvements being primarily directed to releasable locking means for positively retaining such block in a given gripping position lengthwise of the sector bar. In its disclosed form, my floatingly mounted block is enabled to ride radially toward or away from the main pivot 14 because of being slidable lengthwise of its fulcrum or opposed rocking points 23 and 24, although such compensation for misalignment does not represent an essential feature. As a further alternative, the sector bar 18 may likewise be mounted on the far side of the main pivot 14 provided the thigh section is correspondingly extended.

Figure 4:
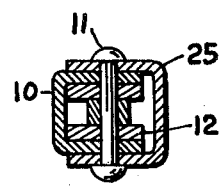

The trip lever 25 may also be stamped up from sheet metal into channeled shape to comprise a pair of similar side flanges 26 and 27 (see Fig. 5) that are integrally interconnected by the web member 28. The mated flanges of the thigh section 10 and those of the shank section 12 may be telescoped within the spaced side flanges of the trip lever in the manner cross-sectionally indicated in Fig. 4. The complementary flanges of the shank section may be inset laterally and extended onwardly toward the main pivot 14 to constitute an integral laminated toe element 29 as detailed in Figs. 5 and 6, a stop lug 30 being provided to limit toe travel in one direction of movement. The transverse fulcrum or knuckle pivot 11 preferably extends through all such component flanges and may also serve to tiltably mount the trip lever having the depending end thereof shaped into a retractible thumb piece 25A.

A concealed compression spring 32 may be interposed to automatically separate the manipulative ends of the lever grip 12A and its cooperating thumb piece. Located in opposite relation to the knuckle pivot, is a headed rivet pin 33 that may be entered through the respective webs of the trip lever and the thigh section. An exposed coiled spring 34 is shown threaded around said rivet pin to normally thrust such web portions toward each other. The other or upper end of the trip lever may be bifurcated to provide for complementary tongues such as 35 adapted to operatively remain in mesh with the spaced jaws 36 of the clutch block 20 and thereby actuate said block when the thumb piece is depressed toward its embraced handle 12A.

It will be observed that in the region of said tongues, the mated flanges of the trip lever are shown widened into triangular configuration, also that the thigh forks 13 are given a similar contour to provide for the installation of a flat oval shaped detent such as 37. This apertured lever locking device may be pivotally mounted upon the fulcrum pin 38 which may extend through both thigh forks. Said detent is further provided with a radial slot 39 having a drag pin 40 entered therethrough as carried by the widened portion of the trip lever flanges. In addition, one edge of such detent is provided with a shiftable shoulder or the like latchable element 41 disposed to engage the toe 29 when the several lever sections assume their relative Fig. 6 inclinations. The detent and the clutch block are operatively linked to shift in unison with the trip lever movements.

With the working parts arranged as described, the intended mode of operation may be traced as follows:

The spring 34 normally urges the meshed end of the trip lever toward the web of the thigh section 10. The opposed edge regions of the clutch block aperture 21 then tightly pinch or bitingly grip the sector bar 18 therebetween in the Fig. 6 manner. The clutch block 20 now lies in a tilted relation with respect to the bar axis X—X, and is snugly retained in such cocked position by said spring. While thus positioned, spring action thrusts the retractible thumb piece 25A away from the lever grip 12A and said thumb piece is positively locked in place by the toe engaged detent 37.

Figure 5:
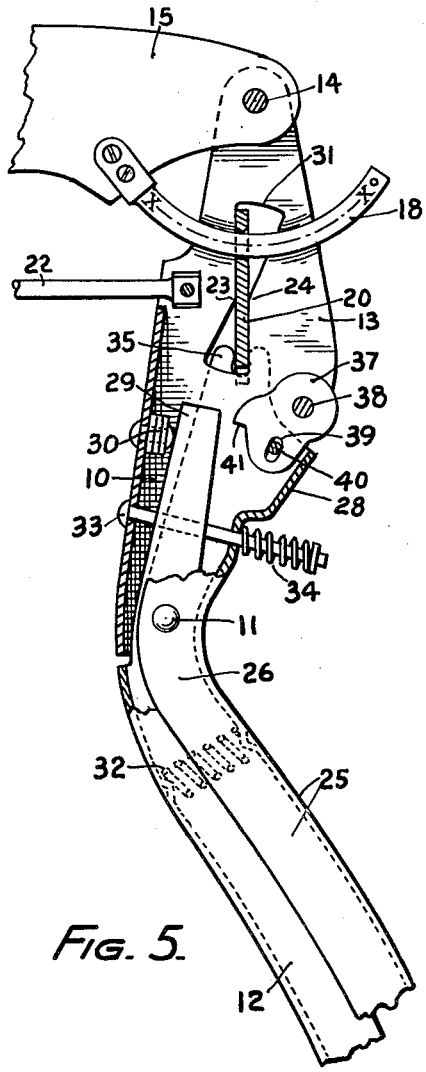
Fig. 5 depicts in partial section, a fragment of said assembly with the clutch block held in released position by gripping the manipulative thumb piece of the trip lever inwardly toward the handle of the shank lever section.

In order to deliberately release the detent into its Fig. 5 position, the shank handle is first squeezed toward the locked thumb piece to disengage the toe 29 which thereupon permits of rotating the clutch block counterclockwise about its fulcrum point 24 so as to bring the longitudinal center line of the block plate into a substantially right angular relation with respect to the bar axis X—X. When so rotated, the released biting edges of the aperture 21 will allow the jointed lever sections 10 and 12 to be freely swung in either direction about the pivot 14. After the liberated thumb piece 25A is allowed to return into its normal position, the spring 34 again automatically throws the clutch block into operative frictional engagement with the sector bar. Since the detent pins 38 and 40 are respectively mounted in the thigh and trip lever sections, any relative movement therebetween will correspondingly rotate the detent locking element 41 between its extreme travel positions shown in Figs. 5 and 6. The drag pin 40 is arranged to travel in unison with the meshed trip lever tongues 36 and the perimetric shape of the bipartite slots 31 limit excessive tilt on part of the clutch block.

Should my compound lever have previously been swung well forwardly away from the instrument board 16 into its "off" or slackened brake band position, the lever grip is intended to be grasped by the driver when setting the brake. A rearward pull exerted upon the depending grip 12A in the arrow direction (see Fig. 1), will then cause the shank section 12 to rotate about the knuckle pivot 11 into a shifted relative inclination until the toe 29 is withdrawn out of detent engagement and into abutment with the stop lug 30 as in Fig. 5. The trip lever 25 is thereby made free to rotate about its intermediate pivot 11. By now depressing the thumb piece 25A while a pull is being exerted upon the lever grip 12A, the clutch block may unobstructedly be shifted into its released Fig. 5 tilt position.

Figure 6:
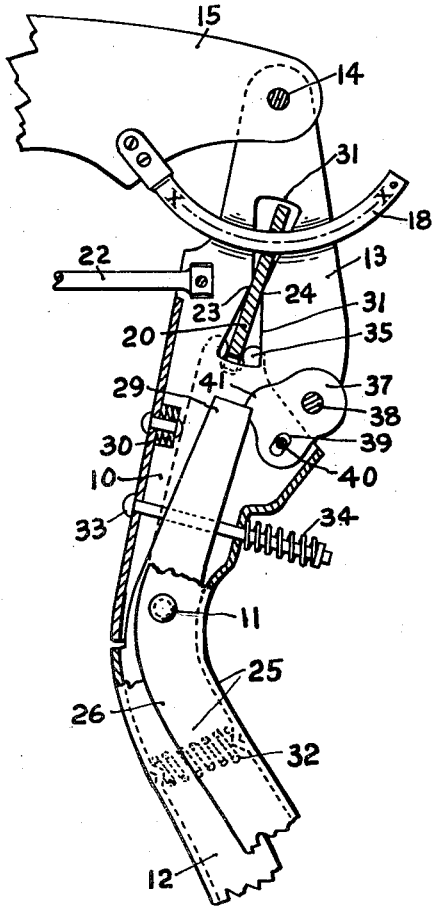
Fig. 6 is similar to Fig. 5 but shows the relationship of the clutch block and the engaged locking detent in set brake position.

Immediately upon separation of the depressed thumb piece from the lever handle, the respective working parts automatically resume their Fig. 6 positions in which the clutch block is again positively locked on the sector bar and the trip lever is rendered non-manipulative because of the detent element 41 having been brought into engagement with the toe 29. In such lever position, the draft rod setting may be fixedly held under tension and blocked against inadvertent brake release. The assembly as a whole acts in the capacity of a one-way brake lever in which augmented tension may at will, be imparted to the draft rod. The manipulative ends of my brake lever sections are intended to be actuated in a prescribed sequence to effect a resetting of the unlatched detent 37 and which relatching is made entirely automatic whenever the defined order of operations is properly carried out.

It will be obvious that the disclosed lever sections need not be stamped up from sheet metal but may be solid forged. As will be understood by those skilled in this art, my improvements also find application to other than emergency brake lever uses and that various structural changes in the details and disposition thereof may be resorted to in likewise carrying out the illustrative embodiment of my lever interlocking devices, all without departing from the spirit and scope of my invention heretofore described and more particularly pointed out in the appended claims.

I claim:

1. A safety brake lever comprising knuckle jointed thigh and shank sections, a main pivot mounting the thigh section thereon for rocking movement, stationary sector bar means provided with a superficially smooth perimeter, releasable clutch means carried by the thigh section and cooperatively mounted to frictionally grip the sector bar means when the brake lever is rocked in one direction, a manipulative trip lever pivotally mounted upon the brake lever and operatively connected to liberate the grip of said clutch means, and automatic locking means for positively retaining the trip lever and thereby blocking said trip lever against manipulative pivotal movement upon bringing said clutch means into gripping engagement with the sector bar means.

2. A safety brake lever comprising knuckle jointed thigh and shank sections, a main pivot mounting the thigh section thereon for rocking movement, stationary sector bar means provided with a superficially smooth perimeter, releasable clutch means carried by the thigh section and cooperatively mounted to frictionally grip the sector bar means when the brake lever is rocked in one direction, means resiliently retaining the respective lever sections in a certain relative inclination about the knuckle joint thereof, a manipulative trip lever pivotally mounted upon said brake lever and operatively connected to liberate the grip of said clutch means, and releasable locking means for positively retaining the trip lever against manipulative pivotal movement upon bringing said clutch means into gripping engagement with the sector bar means and which locking means are released by shifting said lever sections into a different relative inclination.

3. A safety brake lever comprising knuckle jointed thigh and shank sections of which the last named section is provided with toe means, a main pivot mounting the thigh section thereon for rocking movement, means resiliently retaining the respective lever sections in a certain relative inclination about the knuckle joint thereof, arcuate sector bar means disposed about the main pivot, clutch block means pivotally carried by the thigh section and cooperatively mounted upon said bar means for lengthwise and for tilting movement with respect to the longitudinal bar axis, a manipulative trip lever pivotally mounted upon said brake lever and operatively connected to tilt said clutch block means, and detent means including a locking element that automatically engages said toe when the shank and thigh sections assume a different relative inclination.

4. A safety brake lever comprising knuckle jointed thigh and shank sections of which the last named section is provided with toe means, a main pivot mounting the thigh section thereon, a draft rod attached to said thigh section, an arcuate sector bar disposed about the main pivot, clutch block means pivotally carried by the thigh section and which means include mated pinch edges mounted to tilt with respect to the longitudinal bar axis into a certain released position and which edges when tilted into a different position frictionally grip the bar, resilient means urging the clutch block edges into their bar gripping position, a manipulative trip lever pivoted to said brake lever and operatively connected to release the grip of said clutch block means when the trip lever is manipulated, and detent means including a locking element that engages said toe when the clutch block means assumes a bar gripping position, said element being linked to move in unison with the clutch block means.

5. A safety brake lever comprising knuckle jointed thigh and shank sections of sheet metal respectively having a channeled cross-sectional profile including web interconnected side flanges, a free end of the shank section being shaped to provide for a handle and a free end of the thigh section being bifurcated into complementary forks, a main pivot mounting said forks for rocking movement thereon, a draft rod attached to the thigh section and serving to set the brake, toe means for the shank section, said means being interposed between the side flanges of the thigh section and extending toward the main pivot, an arcuate sector bar disposed about the main pivot, clutch block means pivotally carried by the thigh section and which means include a pair of pinch edges mounted to tilt with respect to the longitudinal bar axis into a certain block release position and which edges when tilted into a different position firmly grip the bar against brake release, resilient means urging the clutch block edges into their bar gripping position, a manipulative trip lever pivoted intermediate its ends to the aforesaid brake lever with one trip lever end disposed alongside said handle and the other trip lever end operatively connected to release the grip of said clutch block means when the trip lever is manipulated toward the handle, and detent means including a locking element that automatically engages the toe means when the clutch block means assumes a bar gripping position.

6. A safety brake lever comprising knuckle jointed thigh and shank sections of which the last named section is provided with toe means, a main pivot mounting the thigh section thereon, a draft rod attached to said thigh section, arcuate sector bar means arranged about the main pivot, clutch block means pivotally carried by the thigh section and which means include mated pinch edges mounted to tilt with respect to the longitudinal axis of said bar means into a certain released position and which edges when tilted into a different position firmly grip the bar means, a manipulative trip lever pivoted intermediate its ends to said brake lever with one trip lever end operatively connected to actuate said clutch block means between the aforesaid tilt positions, and detent means including a shiftable locking element that engages said toe when the clutch block means assumes a bar gripping position, said detent means being pivotally mounted on the thigh section and operatively connected with said one lever end to shift said locking element in unison with the actuated clutch block means.

FLOYD D. WENN.